United States Patent
He et al.

(10) Patent No.: US 11,940,902 B2
(45) Date of Patent: Mar. 26, 2024

(54) CODE TESTING METHOD, APPARATUS AND DEVICE, AND COMPUTER-READABLE STORAGE MEDIUM

(71) Applicant: HANGZHOU VANGO TECHNOLOGIES,INC., Hangzhou (CN)

(72) Inventors: Jie He, Hangzhou (CN); Nick Nianxiong Tan, Hangzhou (CN); Xuening Jiang, Hangzhou (CN)

(73) Assignee: HANGZHOU VANGO TECHNOLOGIES, INC., Hangzhou (CN)

( * ) Notice: Subject to any disclaimer, the term of this patent is extended or adjusted under 35 U.S.C. 154(b) by 180 days.

(21) Appl. No.: 17/472,521

(22) Filed: Sep. 10, 2021

(65) Prior Publication Data

US 2021/0406162 A1 Dec. 30, 2021

(30) Foreign Application Priority Data

Mar. 26, 2021 (CN) .......................... 202110327781.5

(51) Int. Cl.
*G06F 11/00* (2006.01)
*G06F 9/445* (2018.01)
*G06F 11/36* (2006.01)

(52) U.S. Cl.
CPC .......... *G06F 11/3688* (2013.01); *G06F 9/445* (2013.01); *G06F 11/3664* (2013.01); *G06F 11/3692* (2013.01)

(58) Field of Classification Search
CPC .......................... G06F 11/3664; G06F 11/3692
USPC ........................................................ 714/1–57
See application file for complete search history.

(56) References Cited

U.S. PATENT DOCUMENTS

| | | | | |
|---|---|---|---|---|
| 6,112,312 A * | 8/2000 | Parker | ............... | G06F 11/263 714/28 |
| 6,418,541 B1 * | 7/2002 | Jeon | ............... | G06F 9/4406 714/36 |
| 8,307,435 B1 * | 11/2012 | Mann | ............... | G06F 21/566 717/124 |
| 2007/0094543 A1 * | 4/2007 | Joshi | ............... | G06F 11/3688 714/38.14 |
| 2014/0201843 A1 * | 7/2014 | Hibbert | ............... | H04L 63/1433 726/25 |
| 2015/0089278 A1 * | 3/2015 | Patapoutian | ............... | G06F 11/1048 714/6.12 |
| 2015/0113331 A1 * | 4/2015 | Bhattacharya | ............... | G06F 11/3688 714/38.1 |

* cited by examiner

*Primary Examiner* — Sarai E Butler
(74) *Attorney, Agent, or Firm* — CBM PATENT CONSULTING, LLC

(57) ABSTRACT

The invention discloses a code testing method. The method includes the following steps of: acquiring a code set to be tested; loading the code set to a corresponding operating chip, and executing the code set by using the operating chip; judging whether a target code subset which is not successfully executed exists in the code set; and if yes, performing an audit testing operation on the code set. The code testing method provided by the invention is simple and feasible to apply, which improves a testing reliability and reduces a testing cost. The invention also discloses a code testing apparatus and device, and a storage medium, which have corresponding technical effects.

10 Claims, 3 Drawing Sheets

CODE TESTING METHOD, APPARATUS AND DEVICE, AND COMPUTER-READABLE STORAGE MEDIUM

CROSS-REFERENCE TO RELATED APPLICATION

This application claims the priority benefit of China application serial no. 202110327781.5, filed on Mar. 26, 2021. The entirety of the above-mentioned patent application is hereby incorporated by reference herein and made a part of this specification.

BACKGROUND

Technical Field

The present invention relates to the field of software testing technologies, and more particularly, to a code testing method, apparatus and device, and a computer-readable storage medium.

Description of Related Art

As network applications become more and more widespread, software security issues have also received more and more attention. Software running on hardware is becoming more and more complicated, and the security and reliability of codes are the top priority, and users have the need for software code testing.

It is very difficult to analyze the security completeness of a program separated from a source code. The existing code testing solution is to test a software executable file independently, and a code application is not run in an actual working scene, which is easy to cause test loopholes. Moreover, the users need to purchase additional software testing solutions, which results in extra expenses and increases unnecessary costs.

In conclusion, how to effectively solve the problems that the existing code testing solution is easy to cause the test loopholes to increase unnecessary costs is an urgent problem for those skilled in the art to solve.

SUMMARY

An objective of the present invention is to provide a code testing method, which is simple and feasible, and improves a testing reliability and reduces a testing cost. Another objective of the present invention is to provide a code testing apparatus and device, and a computer-readable storage medium.

In order to solve the foregoing technical problems, the present invention provides the following technical solutions.

A code testing method includes: acquiring a code set to be tested; loading the code set to a corresponding operating chip, and executing the code set by using the operating chip; judging whether a target code subset which is not successfully executed exists in the code set; and if the target code subset which is not successfully executed exists in the code set, performing an audit testing operation on the code set.

In a specific embodiment of the present invention, the step of loading the code set to the corresponding operating chip and executing the code set by using the operating chip includes: acquiring a preconfigured code testing address page; selecting each code subset in the preconfigured code testing address page from the code set; and loading each code subset to the operating chip. The step of executing each code subset by using the operating chip; and the judging whether the target code subset is not successfully executed in the code set includes: judging whether the target code subset which is not successfully executed exists in each code subset.

In a specific embodiment of the present invention, the step of judging whether the target code subset which is not successfully executed exists in each code subset includes: acquiring an execution result corresponding to each code subset respectively; setting an execution flag bit corresponding to each code subset in a preset storage unit according to each execution result; and judging whether a target code subset with an execution flag bit which is not successfully executed exists in each code subset.

In a specific embodiment of the present invention, the step of setting the execution flag bit corresponding to each code subset in the preset storage unit includes: searching the execution flag bit corresponding to each code subset respectively from the preset storage unit in a non-power-down region in the operating chip; and correspondingly setting each execution flag bit.

A code testing apparatus includes: a code acquisition module configured for acquiring a code set to be tested; a code execution module configured for loading the code set to a corresponding operating chip, and executing the code set by using the operating chip; a judging module configured for judging whether a target code subset which is not successfully executed exists in the code subset; and a code testing module configured for, when it is determined that the target code subset which is not successfully executed exists in the code set, performing an audit testing operation on the code set.

In a specific embodiment of the present invention, the code execution module includes: an address acquisition submodule configured for acquiring a preconfigured code testing address page; a code selecting submodule configured for selecting each code subset in the preconfigured code testing address page from the code set; and a code execution submodule configured for loading each code subset to the operating chip, and executing each code subset by using the operating chip; wherein, the judging module is specifically a module for judging whether the target code subset which is not successfully executed exists in each code subset.

In a specific embodiment of the present invention, the judging module includes: an execution result acquisition submodule configured for acquiring an execution result corresponding to each code subset respectively; a flag bit setting submodule configured for setting an execution flag bit corresponding to each code subset in a preset storage unit according to each execution result; and a judging submodule configured for judging whether a target code subset with an execution flag bit which is not successfully executed exists in each code subset.

In a specific embodiment of the present invention, the flag bit setting submodule is specifically a module for searching the execution flag bit corresponding to each code subset respectively from the preset storage unit in a non-power-down region in the operating chip, and correspondingly setting each execution flag bit.

A code testing device includes: a memory configured for storing a computer program; and a processor configured for executing the steps of the code testing method as previously mentioned when executing the computer program.

A computer-readable storage medium, wherein a computer program is stored on the computer-readable storage medium, and the computer program, when executed by a processor, implements the steps of the code testing method as previously mentioned.

According to the code testing method provided by the present invention, the code set to be tested is acquired; the code set is loaded to the corresponding operating chip, and the code set is executed by using the operating chip; the target code subset which is not successfully executed is judged whether to exist in the code set; and if yes, the audit testing operation is performed on the code set.

It can be seen from the above technical solution that after the code set to be tested is acquired, the code set is loaded to the corresponding operating chip, and the code set is executed by using the operating chip. When the target code subset which is not successfully executed exists in the code set, audit testing is further performed on the code set. A hardware chip used for code testing is the operating chip of the code, which does not need extra overhead and is simple and feasible. Moreover, a test result truly reflects an execution situation of the code on the operating chip, an external interference is eliminated, a testing reliability is improved, and a testing cost is effectively reduced.

Accordingly, the present invention also provides the code testing apparatus, device and the computer-readable storage medium corresponding to the above code testing method, which have the above technical effects and will not be elaborated herein.

BRIEF DESCRIPTION OF THE DRAWINGS

In order to illustrate the technical solutions in the embodiments of the present invention or in the prior art more clearly, the drawings used in the description of the embodiments or the prior art will be briefly described below. Obviously, the drawings in the following description are merely some embodiments of the present invention. For those of ordinary skills in the art, other drawings may also be obtained based on these drawings without going through any creative work.

DESCRIPTION OF THE EMBODIMENTS

To enable those skilled in the art to better understand the solutions of present invention, the present invention will be further described in detail below with reference to the drawings and embodiments. Obviously, the embodiments described are merely a part of, rather than all of, the embodiments of the present invention. Based on the embodiments of the present invention, all other embodiments obtained by those of ordinary skills in the art without going through any creative work shall fall within the protection scope of the present invention.

First Embodiment

Figure 1:
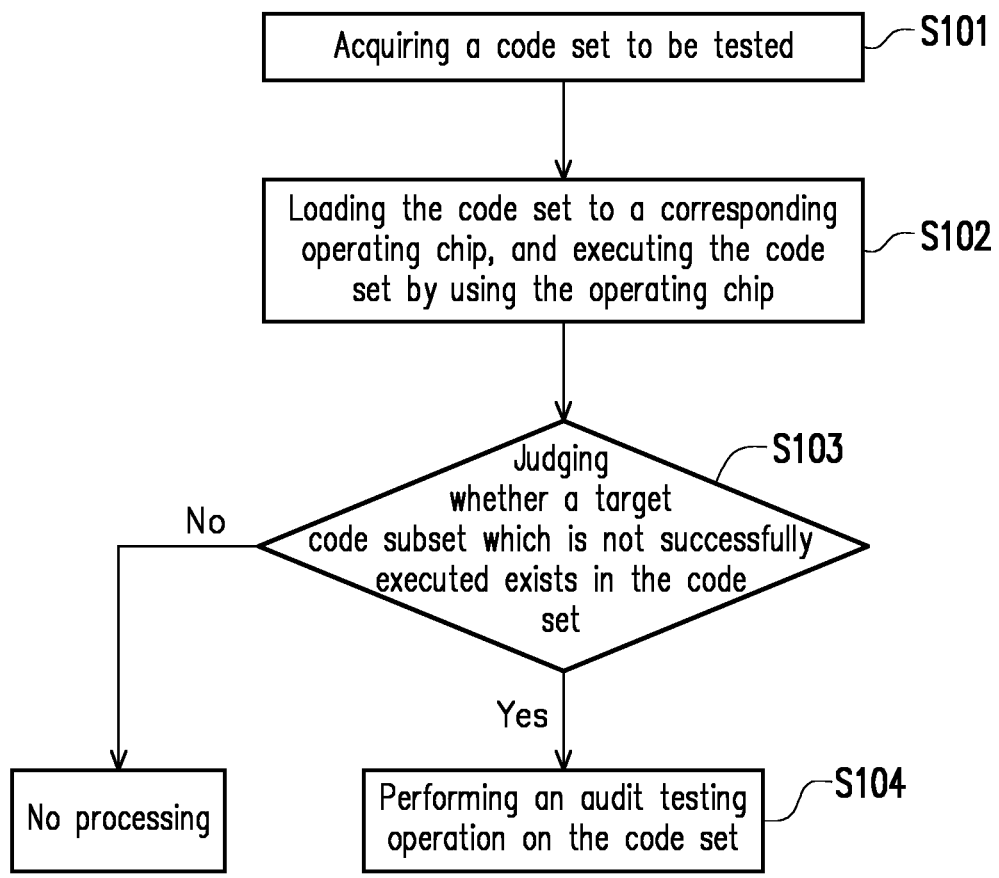
FIG. 1 is an implementation flow chart of a code testing method in an embodiment of the present invention.

Referring to FIG. 1, FIG. 1 is an implementation flow chart of a code testing method in an embodiment of the present invention, wherein the method may include the following steps.

In S101, a code set to be tested is acquired.

When code testing is needed, the code set to be tested is acquired.

In S102, the code set is loaded to a corresponding operating chip, and the code set is executed by using the operating chip.

After the code set to be tested is acquired, the code set is loaded to the corresponding operating chip, and the code set is executed by using the operating chip. By taking the operating chip of the code as a test chip for testing, the code is applied and operated in an actual working scene, so that a test result truly reflects an execution situation of the code on the operating chip, and an external interference is eliminated.

In S103, whether a target code subset which is not successfully executed exists in the code set is judged. If the target code subset which is not successfully executed exists in the code set, step S104 is executed. If the target code subset which is not successfully executed does not exist in the code set, no processing is performed.

In the process of executing the code set by using the operating chip, the target code subset which is not successfully executed is judged whether to exist in the code set; if yes, it is indicated that a code that cannot be executed normally on the operating chip exists; then step S104 is executed; if no, it is indicated that all the codes in the code set can be executed successfully, and no processing is performed.

In S104, an audit testing operation on the code set is performed.

When it is determined that the target code subset which is not successfully executed exists in the code set, the audit testing operation is performed on the code set. By using the operating chip as the test chip to perform black box testing on the code, further code audit is performed only the target code subset which is not successfully executed exists in the code set, which effectively reduces the testing cost.

It can be seen from the above technical solution that after the code set to be tested is acquired, the code set is loaded to the corresponding operating chip, and the code set is executed by using the operating chip. When the target code subset which is not successfully executed exists in the code set, audit testing is further performed on the code set. A hardware chip used for code testing is the operating chip of the code, which does not need extra overhead and is simple and feasible. Moreover, a test result truly reflects an execution situation of the code on the operating chip, an external interference is eliminated, a testing reliability is improved, and a testing cost is effectively reduced.

It should be noted that, based on the first embodiment, the embodiments of the present invention also provide a corresponding improvement solution. In the subsequent embodiments, the same steps or corresponding steps as those in the first embodiment can be referred to each other, and the corresponding beneficial effects can also be referred to each other, so they will not be elaborated in detail in the following improved embodiments.

Second Embodiment

Figure 2:
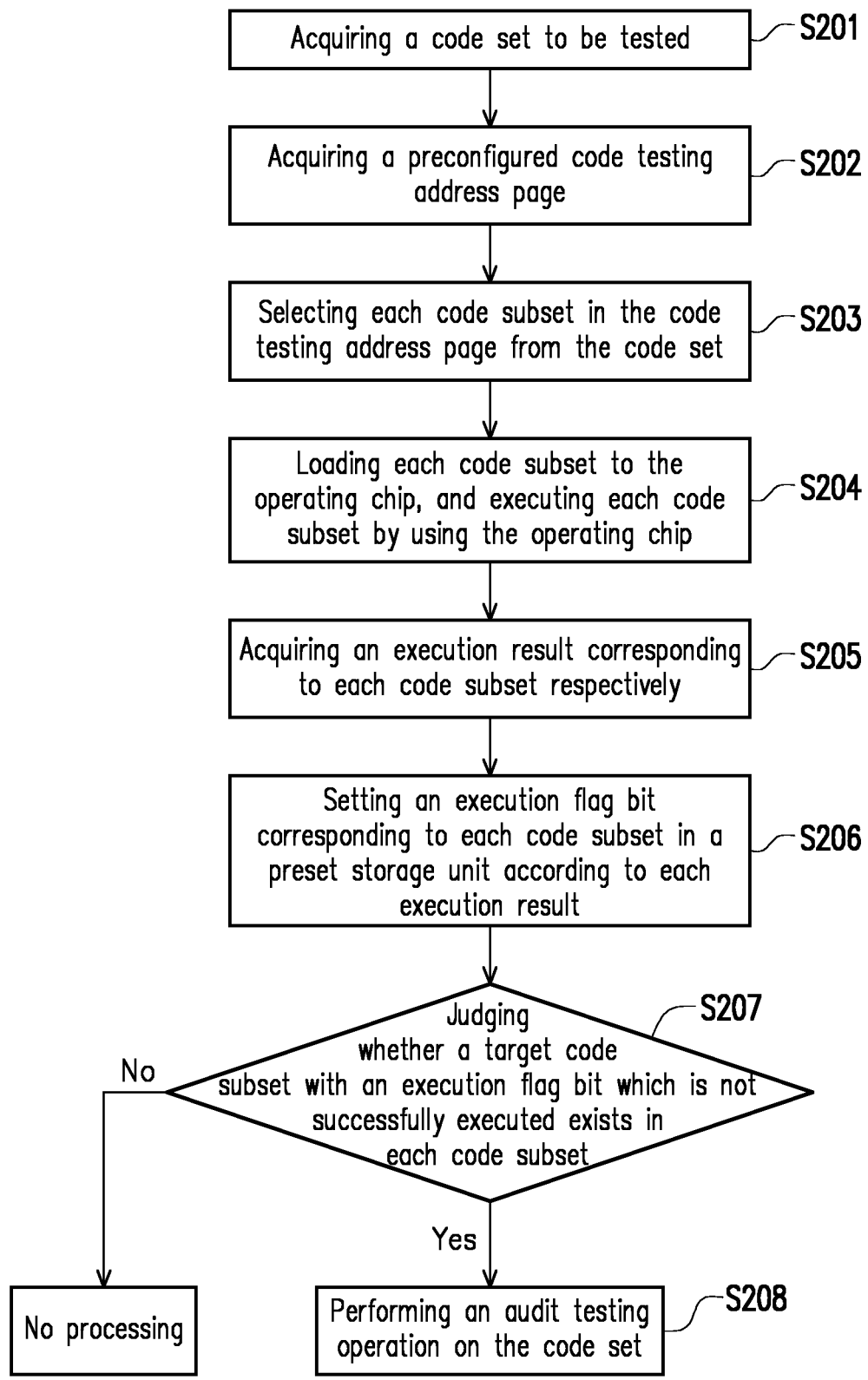
FIG. 2 is another implementation flow chart of a code testing method in an embodiment of the present invention.

Referring to FIG. 2, FIG. 2 is another implementation flow chart of a code testing method in an embodiment of the present invention, wherein the method may include the following steps.

In S201, a code set to be tested is acquired.

In S202, a preconfigured code testing address page is acquired.

The preconfigured code testing address page may be preconfigured according to test requirements. After acquiring the code set to be tested, a code snooper program may be preset, a CPU bus signal is captured by the code snooper program, and the code test request is judged whether to be a valid transmission according to the CPU bus signal. If the code test request is judged whether to be a valid transmission, the preconfigured code testing address page is acquired.

It should be noted that the configuration process of the preconfigured code testing address page may be set and adjusted according to the actual situation, which is not limited in the embodiments of the present invention; for example, it can be set to select each code testing address obtained by dividing the address in a unit of 8 KB.

In S203, each code subset in the preconfigured code testing address page is selected from the code set.

After acquiring the preconfigured code testing address page, each code subset in the preconfigured code testing address page is selected from the code set.

In S204, each code subset is loaded to the operating chip, and each code subset is executed by using the operating chip.

After each code subset in the preconfigured code testing address page is selected from the code set, each code subset is loaded to the operating chip and executed by using the operating chip. Therefore, a sampling test of the code set is realized; when a code amount is large, by selecting the code to be tested according to the preconfigured code testing address page, a testing time is greatly saved and a testing efficiency is improved in comparison to a method of performing full volume test on the code.

In S205, an execution result corresponding to each code subset respectively is acquired.

After each code subset in the preconfigured code testing address page is executed by using the operating chip, the execution result corresponding to each code subset is acquired respectively, in other words, a result whether the code is successfully executed is acquired.

In S206, an execution flag bit corresponding to each code subset in a preset storage unit is set according to each execution result.

The storage unit is set in the operating chip in advance, and the storage unit is used to store the execution flag bit of each code address, so that the flag bit of one bit corresponding to each code subset can be set. Each execution flag bit is initialized in advance. After the execution result corresponding to each code subset is acquired respectively, each execution flag bit respectively corresponding to each code subset in the preset storage unit is set according to each execution result. For example, each execution flag bit in the preset storage unit can be initialized to 0 in advance, and when the code is successfully executed, the execution flag bit at the corresponding position is turned to 1.

In a specific embodiment of the present invention, the setting the execution flag bit corresponding to each code subset in the preset storage unit according to each execution result may include the following steps.

Step 1: the execution flag bit corresponding to each code subset respectively is searched from the preset storage unit in a non-power-down region in the operating chip.

Step 2: each execution flag bit is correspondingly set.

For convenience of description, the above two steps may be combined for explanation.

The preset storage unit for storing the execution flag bits of each code address is arranged in a non-power-down region in the operating chip, so that the preset storage unit supports a code containing a low power consumption mode, and even if the code executes the low power consumption mode, data in the preset storage unit will not be lost.

In S207, whether a target code subset with an execution flag bit which is not successfully executed exists in each code subset is judged. If the target code subset with the execution flag bit which is not successfully executed exists in each code subset, step S208 is executed, and if the target code subset with the execution flag bit which is not successfully executed does not exist in each code subset, no processing is performed.

After setting the execution flag bit corresponding to each code subset in the preset storage unit according to each execution result, a target code subset with an execution flag bit which is not successfully executed is judged whether to exist in each code subset; if yes, step S208 is executed, and if no, no processing is performed. Taking the above example, when a target code subset with a flag bit being still 0 exists in each code subset, step S208 is executed.

In S208, an audit testing operation on the code set is performed.

Third Embodiment

Corresponding to the above method embodiments, the present invention also provides a code testing apparatus. The code testing apparatus described below and the code testing method described above can be referenced correspondingly.

Figure 3:
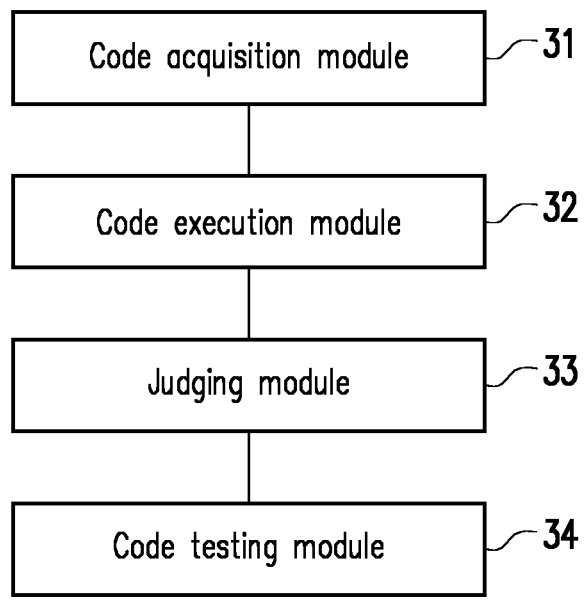
FIG. 3 is a structure block diagram of a code testing apparatus in an embodiment of the present invention.

Referring to FIG. 3, FIG. 3 is a structure block diagram of a code testing apparatus in an embodiment of the present invention. The apparatus may include: a code acquisition module 31 configured for acquiring a code set to be tested; a code execution module 32 configured for loading the code set to a corresponding operating chip, and executing the code set by using the operating chip; a judging module 33 configured for judging whether a target code subset which is not successfully executed exists in the code subset; and a code testing module 34 configured for, when it is determined that the target code subset which is not successfully executed exists in the code set, performing an audit testing operation on the code set.

It can be seen from the above technical solution that after the code set to be tested is acquired, the code set is loaded to the corresponding operating chip, and the code set is executed by using the operating chip. When the target code subset which is not successfully executed exists in the code set, audit testing is further performed on the code set. A hardware chip used for code testing is the operating chip of the code, which does not need extra overhead and is simple and feasible. Moreover, a test result truly reflects an execution situation of the code on the operating chip, an external interference is eliminated, a testing reliability is improved, and a testing cost is effectively reduced.

In a specific embodiment of the present invention, the code execution module 32 includes: an address acquisition submodule configured for acquiring a preconfigured code testing address page; a code selecting submodule configured for selecting each code subset in the preconfigured code testing address page from the code set; and a code execution submodule configured for loading each code subset to the operating chip, and executing each code subset by using the operating chip. The judging module 33 is specifically a module for judging whether the target code subset which is not successfully executed exists in each code subset.

In a specific embodiment of the present invention, the judging module 33 includes: an execution result acquisition submodule configured for acquiring an execution result corresponding to each code subset respectively; a flag bit setting submodule configured for setting an execution flag bit corresponding to each code subset in a preset storage unit according to each execution result; and a judging submodule configured for judging whether a target code subset with an execution flag bit which is not successfully executed exists in each code subset.

In a specific embodiment of the present invention, the flag bit setting submodule is specifically a module for searching the execution flag bit corresponding to each code subset respectively from the preset storage unit in a non-power-down region in the operating chip, and correspondingly setting each execution flag bit.

Figure 4:
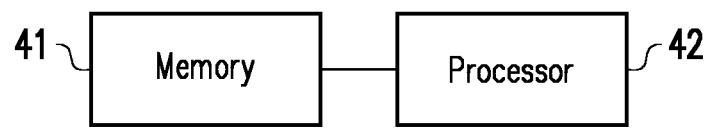
FIG. 4 is a structure block diagram of a code testing device in an embodiment of the present invention.

Corresponding to the above method embodiments, refer to FIG. 4. FIG. 4 is a schematic diagram of a code testing device provided by the present invention. The device may include: a memory 41 configured for storing a computer program; and a processor 42 configured for, when executing the computer program stored in the memory 41 mentioned above, implementing the following steps: acquiring a code set to be tested; loading the code set to a corresponding operating chip, and executing the code set by using the operating chip; judging whether a target code subset which is not successfully executed exists in the code set; and if yes, performing an audit testing operation on the code set.

Please refer to the above method embodiments for the introduction of the device provided by the present invention, which will not be elaborated here.

Corresponding to the above method embodiments, the present invention further provides a computer-readable storage medium, wherein a computer program is stored on the computer-readable storage medium, and the computer program, when executed by a processor, implements the following steps: acquiring a code set to be tested; loading the code set to a corresponding operating chip, and executing the code set by using the operating chip; judging whether a target code subset which is not successfully executed exists in the code set; and if yes, performing an audit testing operation on the code set.

The computer-readable storage medium may include any medium that is capable of storing program codes such as a universal serial bus (USB) disk, a mobile hard disk, a read-only memory (ROM), a random access memory (RAM), a magnetic disk or an optical disk, and the like.

Please refer to the above method embodiments for the introduction of the computer-readable storage medium provided by the present invention, which will not be elaborated here.

The various embodiments in this specification are described in a progressive manner. Each embodiment focuses on the differences from the other embodiments, and the same or similar parts between the various embodiments may be referred to each other. The apparatus, the device and the computer-readable storage medium disclosed in the embodiments are described relatively simple since they are corresponding to the method disclosed in the embodiments, and the relevant points can refer to the explanation of the method part.

Specific examples are used herein to illustrate the principles and embodiments of the present invention. The description of the above embodiments is only used to help understand the technical solutions and core ideas of the present invention. It should be pointed out that for those of ordinary skills in the art, several improvements and modifications can be made to the present invention without departing from the principle of the present invention, and these improvements and modifications also fall within the protection scope of the claims of the present invention.

What is claimed is:

1. A code testing method, comprising:
   acquiring a code set to be tested;
   loading the code set to an operating chip, and executing the code set by using the operating chip; and
   judging whether a target code subset which is not successfully executed exists in the code set;
   wherein in response to the target code subset which is not successfully executed exists in the code set, an audit testing operation on the code set is performed;
   in response to all codes in the code set are executed successfully, no processing is performed.

2. The code testing method according to claim 1, wherein loading the code set to the operating chip and executing the code set by using the operating chip comprises:
   acquiring a preconfigured code testing address page;
   selecting each code subset in the preconfigured code testing address page from the code set; and
   loading each code subset to the operating chip, and executing each code subset by using the operating chip;
   wherein judging whether the target code subset which is not successfully executed exists in the code set comprises:
   judging whether the target code subset which is not successfully executed exists in each code subset.

3. The code testing method according to claim 2, wherein judging whether the target code subset which is not successfully executed exists in each code subset comprises:
   acquiring an execution result corresponding to each code subset respectively;
   setting an execution flag bit corresponding to each code subset in a preset storage unit according to each execution result; and
   judging whether a target code subset with an execution flag bit which is not successfully executed exists in each code subset.

4. The code testing method according to claim 3, wherein setting the execution flag bit corresponding to each code subset in the preset storage unit comprises:
   searching the execution flag bit corresponding to each code subset respectively from the preset storage unit in a non-power-down region in the operating chip; and
   correspondingly setting each execution flag bit.

5. A code testing apparatus, comprising:
   a memory, configured for store a code acquisition module, a code execution module, a judging module and a code testing module; and
   a processor, coupled to the memory and configured for executing the code acquisition module, the code execution module, the judging module and the code testing module to:
   by the code acquisition module, acquire a code set to be tested;
   by the code execution module, load the code set to an operating chip, and execute the code set by using the operating chip;
   by the judging module, judge whether a target code subset which is not successfully executed exists in a code subset; and
   by the code testing module, when it is determined that the target code subset which is not successfully executed exists in the code set, perform an audit testing operation on the code set in response to the target code subset which is not successfully executed exists in the code set, wherein in response to all codes in the code set are executed successfully, no processing is performed.

6. The code testing apparatus according to claim 5, wherein the code execution module comprises:
   an address acquisition submodule configured for acquiring a preconfigured code testing address page;
   a code selecting submodule configured for selecting each code subset in the preconfigured code testing address page from the code set; and
   a code execution submodule configured for loading each code subset to the operating chip, and executing each code subset by using the operating chip;
   wherein, the judging module is specifically a module for judging whether the target code subset which is not successfully executed exists in each code subset.

7. The code testing apparatus according to claim 6, wherein the judging module comprises:
   an execution result acquisition submodule configured for acquiring an execution result corresponding to each code subset respectively;
   a flag bit setting submodule configured for setting an execution flag bit corresponding to each code subset in a preset storage unit according to each execution result; and
   a judging submodule configured for judging whether a target code subset with an execution flag bit which is not successfully executed exists in each code subset.

8. The code testing apparatus according to claim 7, wherein the flag bit setting submodule is specifically a module for searching the execution flag bit corresponding to each code subset respectively from the preset storage unit in a non-power-down region in the operating chip, and correspondingly setting each execution flag bit.

9. A code testing device, comprising:
   a memory configured for storing a computer program; and
   a processor configured for executing the steps of the code testing method according to claim 1 when executing the computer program.

10. A non-transitory computer-readable storage medium, wherein a computer program is stored on the computer-readable storage medium, and the computer program, when executed by a processor, implements the steps of the code testing method according to claim 1.

\* \* \* \* \*